United States Patent [19]

Adrian

[11] 4,061,884

[45] Dec. 6, 1977

[54] ARRANGEMENT FOR CONTROLLING THYRISTOR NETWORKS

[75] Inventor: James Mark Adrian, Naperville, Ill.

[73] Assignee: Bell Telephone Laboratories, Incorporated, Murray Hill, N.J.

[21] Appl. No.: 712,012

[22] Filed: Aug. 5, 1976

[51] Int. Cl.$^2$ ............................................. H04Q 3/50
[52] U.S. Cl. ................................................ 179/18 GF
[58] Field of Search ...................... 179/18 GF, 18 GE; 340/166 R; 307/252

[56] References Cited

U.S. PATENT DOCUMENTS

| | | | |
|---|---|---|---|
| 3,688,051 | 8/1972 | Aagaard | 179/18 GF |
| 3,976,845 | 8/1976 | Ashley | 179/18 GF |

FOREIGN PATENT DOCUMENTS

| | | | |
|---|---|---|---|
| 17,538 | 1969 | Japan | 179/18 GF |

OTHER PUBLICATIONS

Laane, "Hilo-An Improved Trans'n Scheme for Semiconductor Switching Net'ks.", Bell Syst. Tech. Jour. vol. 50, No. 3, Mar. 1971, pp. 1089-1093.

*Primary Examiner*—Thomas A. Robinson
*Attorney, Agent, or Firm*—Kenneth H. Samples; Peter Visserman

[57] ABSTRACT

An arrangement for establishing communication paths through a plurality of serially connected thyristors comprising a first and last thyristor, is disclosed. Each thyristor comprises a main conduction path terminating in a first and second main conduction electrode and a control path between the first electrode and a gate electrode. The second main conduction electrode of each thyristor, except the last, is connected to the first main conduction electrode of a subsequent thyristor. To establish a path, a marking potential is applied to the first main conduction electrode of the first thyristor and gate currents, equal to or greater than the thyristor holding currents, are produced in the control paths of the thyristors in sequence and overlapped in time from the first to the last. A hold current is then produced in the second main conduction electrode of the last thyristor and the gate currents are terminated. Additionally, a gate current applied to a given thyristor can be terminated after the gate current of a succeeding device is flowing in the main conduction path of the given thyristor.

15 Claims, 10 Drawing Figures

| FF STATE | | | STAGE STATE | | | | |
|---|---|---|---|---|---|---|---|
| A | B | C | G0 | G1 | G2 | G3 | G4 |
| 0 | 0 | 0 | 0 | 0 | 0 | 0 | 1 |
| 1 | 0 | 0 | 1 | 0 | 0 | 0 | 0 |
| 1 | 1 | 0 | 1 | 1 | 0 | 0 | 0 |
| 1 | 1 | 1 | 0 | 1 | 1 | 0 | 0 |
| 0 | 1 | 1 | 0 | 0 | 1 | 1 | 0 |
| 0 | 0 | 1 | 0 | 0 | 0 | 1 | 0 |

ARRANGEMENT FOR CONTROLLING THYRISTOR NETWORKS

FIELD OF THE INVENTION

This invention relates to solid-state switching networks and more particularly to thyristor networks and arrangements for establishing communication paths therethrough.

The thyristor is a device having four alternating N and P type semiconductor regions including, in sequence, a P type anode, an N type anode gate, a P type cathode gate, and an N type cathode. The main conduction path of the device is between the anode and cathode. The gate terminals in conjunction with their associated anode or cathode are control inputs for the main conduction path and are partially coincident therewith. In the "off state" a high impedance is exhibited between the anode and cathode (the main conduction path), however, when the current in the main conduction path exceeds a given threshold, called the holding current, a low impedance path is provided between anode and cathode. This low impedance path, which is the characteristic of the device being in the "on state", will remain until the current in the main conduction path falls below the holding current. Due to the high impedance of the main conduction path of a thyristor in the "off state" a relatively high voltage must be developed between its anode and cathode before it changes to the "on state". Increasing the gate current in either of the control paths of a thyristor in the "off state" effectively reduces the anode to cathode voltage required to change the device to the "on state".

Thyristor switching networks, as known in the prior art, consist of a plurality of interconnected matrices with a thyristor at each crosspoint in each matrix. A communication path through such a network comprises an input terminal and an output terminal and a plurality of thryistors serially connected anode to cathode therebetween. Two basic methods for establishing such communication paths are shown in the prior art. In accordance with the first arrangement, a network input (output) terminal is marked with an appropriate voltage and current sources are simultaneously applied to the gates of all thyristors which are intended to be in the communication path. The thyristors "turn on" in sequence away from the mark and the holding current for the crosspoints is supplied through successive thyristor gate terminals until a path has been established through the entire network. At this point a current source is applied to the output (input) terminal of the network which current holds the path in the "on state". Since all gate currents are simultaneously applied the thyristors of this arrangement change state without individual control creating very rapid voltage fluctuations. These rapid voltage changes can cause thyristors which are not to form a part of the communication path, to be "turned on".

With the second arrangement for establishing thyristor communication paths, a first terminal is marked with an appropriate voltage and current pulses are applied in sequence to the gates of the thyristors which have been selected to make up the communication path. The current pulses applied to the thyristor gates are spaced apart in time and separate current sources, connected to the conductors between the switching matrices provide the holding current as successive devices receive the gate current pulses. Controlling the gate current to each thyristor individually can reduce the possibility of spurious thyristor "turn on" caused by rapid voltage changes, but this second arrangement, requires the additional current sources between all switching matrices in order to establish and maintain a communication path.

It is an object of the present invention to provide a thyristor communication path establishment arrangement which avoids the problems due to rapid voltage changes while avoiding the necessity for individual current sources between the matrices.

SUMMARY OF THE INVENTION

As previously stated a thyristor has two gate regions. In the embodiments which follow only one type of gate is required to practice the invention. However, the invention can be practiced with either of the gate regions by changing the polarity of certain current and voltage sources as described later herein.

The invention utilizes a plurality of thyristors including a first and a last thyristor, and each thyristor has a first and second main conduction electrode and a gate electrode. The main conduction paths of the thyristors are serially connected by connecting the second main conduction electrode of each thyristor, except the last, to the first main conduction electrode of a subsequent thyristor. A marking voltage generator is connected to the first main conduction electrode of the first thyristor and a hold current generator is connected to the second main conduction electrode of the last thyristor. In order to establish a communication path, a marking potential is applied by the marking voltage generator to the first main conduction electrode of the first thyristor and gate currents are produced in the control paths of each of the serially connected thyristors in sequence and overlapped in time by a plurality of controlled current sources. These current sources provide a current which is equal to or in excess of the hold current of the thyristors. The gate current produced in successive thyristors flows between the marking potential and the thyristor gate electrodes, via the main conduction paths of preceding thyristors, and provides the holding current for all preceding devices. After the gate current has been produced in the last thyristor, a holding current is applied to the second main conduction electrode of the last thyristor and the gate currents are terminated. As an additional aspect of the invention, the gate current produced in any given thyristor is terminated after a gate current produced in a succeeding device is flowing in the main conduction path of the given thyristor. This termination of gate currents reduces the magnitude of the current flowing in the voltage marking source.

In the discussion which follows the use of the cathode gate is described in detail while the use of the anode gate in the practice of this invention is only generally discussed. The present invention includes path establishment arrangements utilizing either thyristor gate.

DETAILED DESCRIPTION

Figure 1:
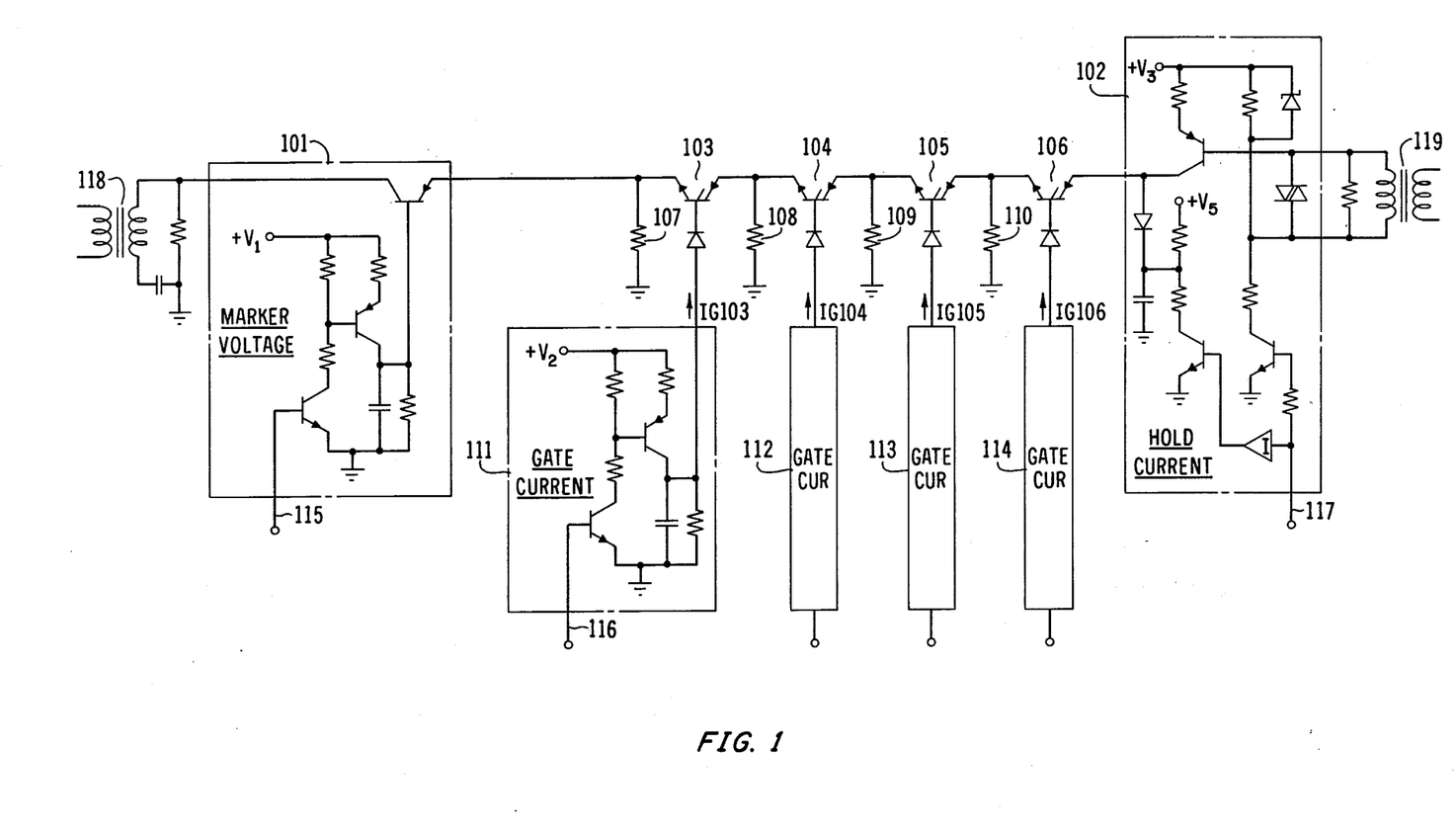
FIG. 1 is a representation of a thyristor communication path embodying the present invention wherein cathode gates are utilized.

FIG. 1 shows a serially connected thyristor path consisting of a marker voltage source 101, a hold current source 102, and four thyristors 103 through 106. In the present example only the cathode gates of thyristors 103 through 106 are utilized in path establishment. Also shown are a plurality of resistors 107 through 110, which are connected between the thyristor cathodes and ground and four gate current sources 111 through 114. The combination of switching matrices which result in a communication path as shown in FIG. 1 and a control arrangement for establishing such a path are described in greater detail later herein.

Figure 6:
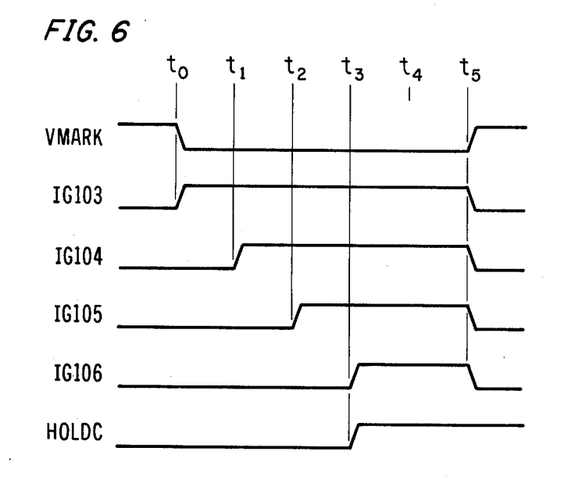
FIGS. 6 and 7 are timing diagrams useful in understanding the present invention.

The application of voltages and currents to the circuit of FIG. 1 to establish a communication path is shown in graphic form in FIG. 6. The voltages and the gate currents applied to the thyristors are controlled to have sloped leading and trailing edges in order to avoid rapid voltage changes by the thyristors and thereby avoid the potential for activating spurious thyristors. Initially, by applying a logical "0" to marker voltage conductor 115 and a logical "1" to a control conductor 116 of gate current source 111, marker voltage source 101 reduces the potential at the cathode of thyristor 103 and a gate current IG-103 is applied to the gate of thyristor 103. Gate current IG-103 flows from the gate of thyristor 103 to the low voltage source 101 via the cathode of thyristor 103. After the establishment of gate current IG-103, a gate current IG-104 is applied to the gate of thyristor 104 by gate current source 112. All of the gate currents referred to herein are equal to or in excess of the thyristor holding current of the devices utilized. The gate current IG-104 passes to the marker voltage source 101 via the cathode of thyristor 104 and the main conduction path of thyristor 103. Gate current IG-104 by flowing through the main conduction path of thyristor 103 becomes the holding current for thyristor 103. Gate currents IG-105 and IG-106 are similarly applied to their respective thyristors in sequence, each providing hold current for the preceding thyristors of the path. Accordingly, the gate currents are applied to thyristors 103 through 106 in sequence and overlapped in time. When gate current IG-106 is applied to the gate of the last thyristor (106) in the present example, hold current source 102 is activated, by a control signal on hold current source conductor 117, to apply a holding current to the anode of thyristor 106. The holding current from hold current source 102 flows serially through the main conduction path of each thyristor to the marker voltage source 101. After the hold current from hold current source 102 is established all of the gate currents IG-103 through IG-106 are terminated. The path remains until the hold current from the hold current source 102 is terminated. After the path is established, marker voltage source 101 can be controlled to increase the voltage at the cathode of thyristor 103. The holding current from hold current source 102 will maintain the established path after this increase of input voltage. Information can be transmitted between the input and output of the network via the established path by coupling such information to the path by means of transformers 118 and 119.

Figure 7:
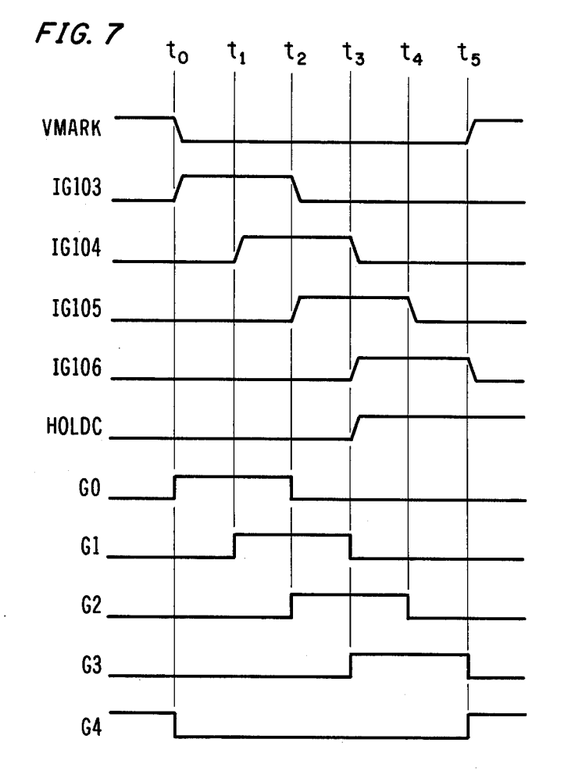

The gate currents applied to the arrangement of FIG. 1 can also be applied as shown graphically in FIG. 7. In this arrangement each gate current is applied to its associated thyristor in sequence, then removed after the gate current has been applied to the immediately subsequent thyristor. The gate currents to preceding thyristors can be removed, since the gate currents of the subsequent thyristors operate as holding currents for the preceding thyristors. It will be noted that operation in accordance with FIG. 7 also results in the sequential and overlapped application of gate currents.

Figure 2:
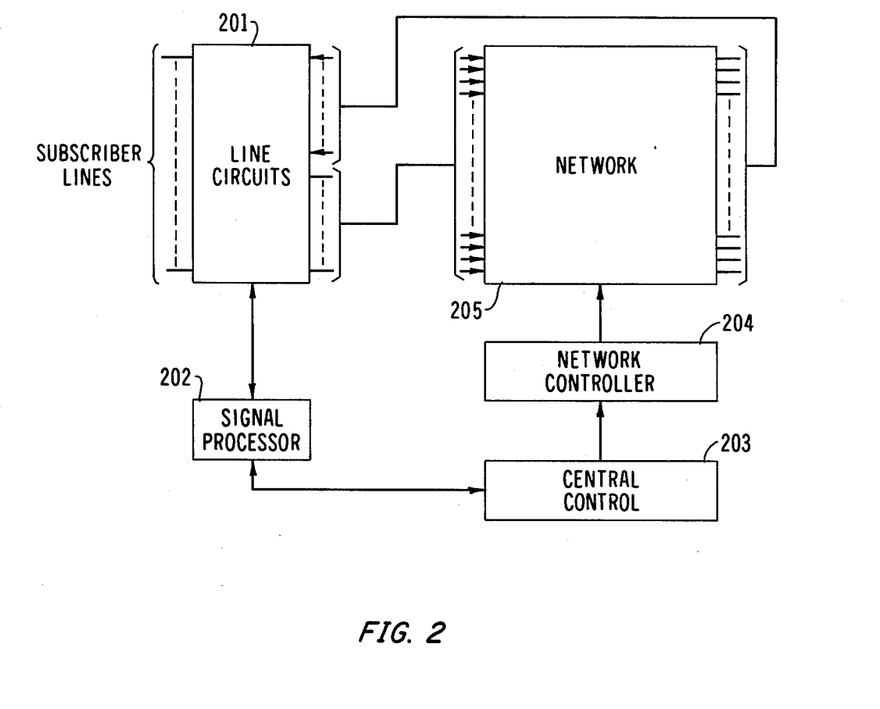
FIG. 2 is a block diagram of a switching system.

FIG. 2 shows a switching system which utilizes the present invention for switching signals among 256 subscriber lines. The subscriber lines are connected to line circuit unit 201 and to individual input terminals of a switching network 205. A signal processor 202 detects the calling status of each subscriber line and if a request for service or a termination request is present, this fact is communicated to a central control 203. In response to changes in the calling status of the subscriber lines, central control 203 generates control words for establishing or removing a communication path depending on the necessary action. The control words are transmitted to a network controller 204 which implements the control of the network. Central control 203 can, for example, be of the type disclosed in *The Bell System Technical Journal*, Volume 43, September, 1964.

Figure 3:
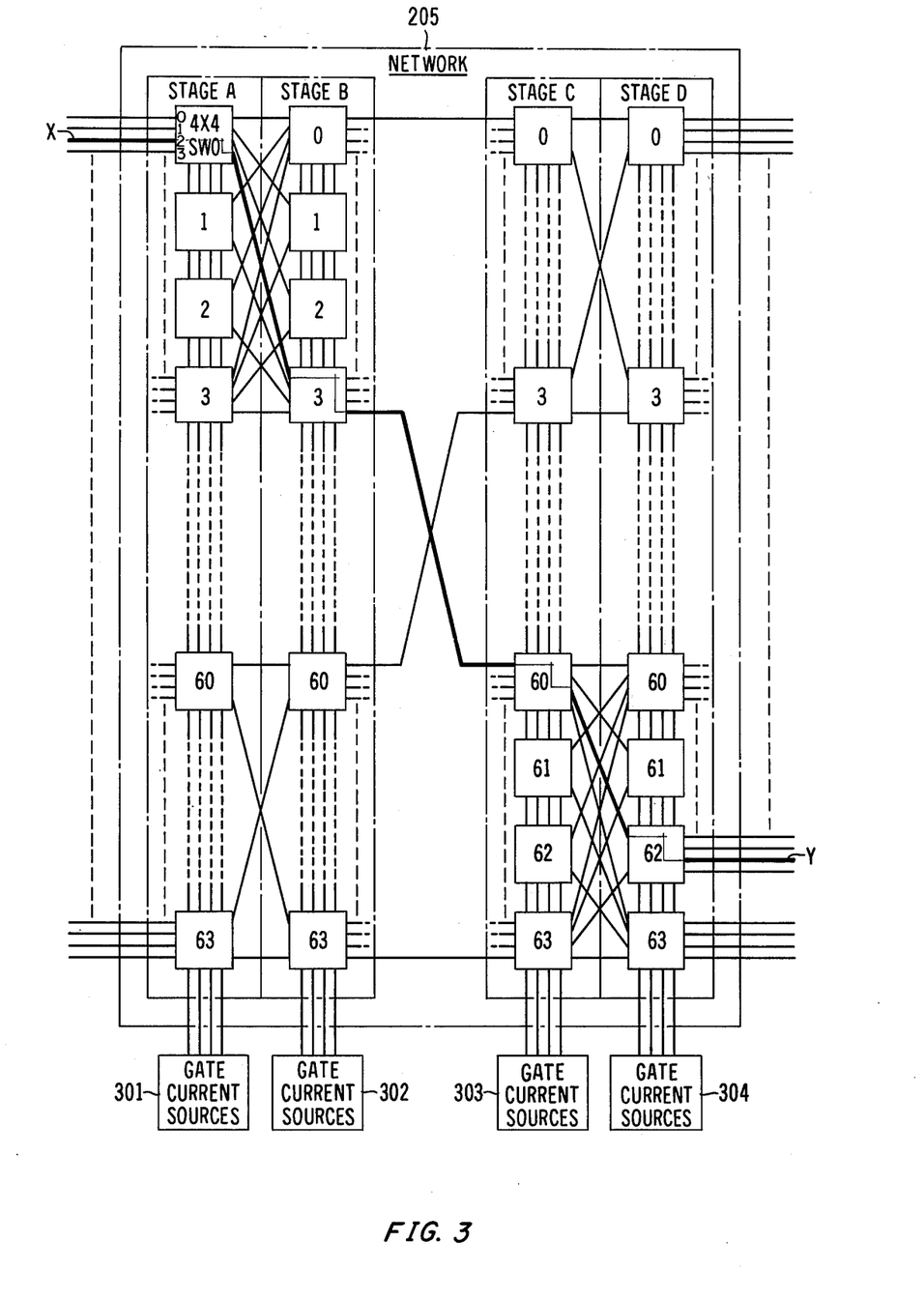
FIG. 3 is a representation of the interconnections of a thyristor switching network.
Figures 4, 8:
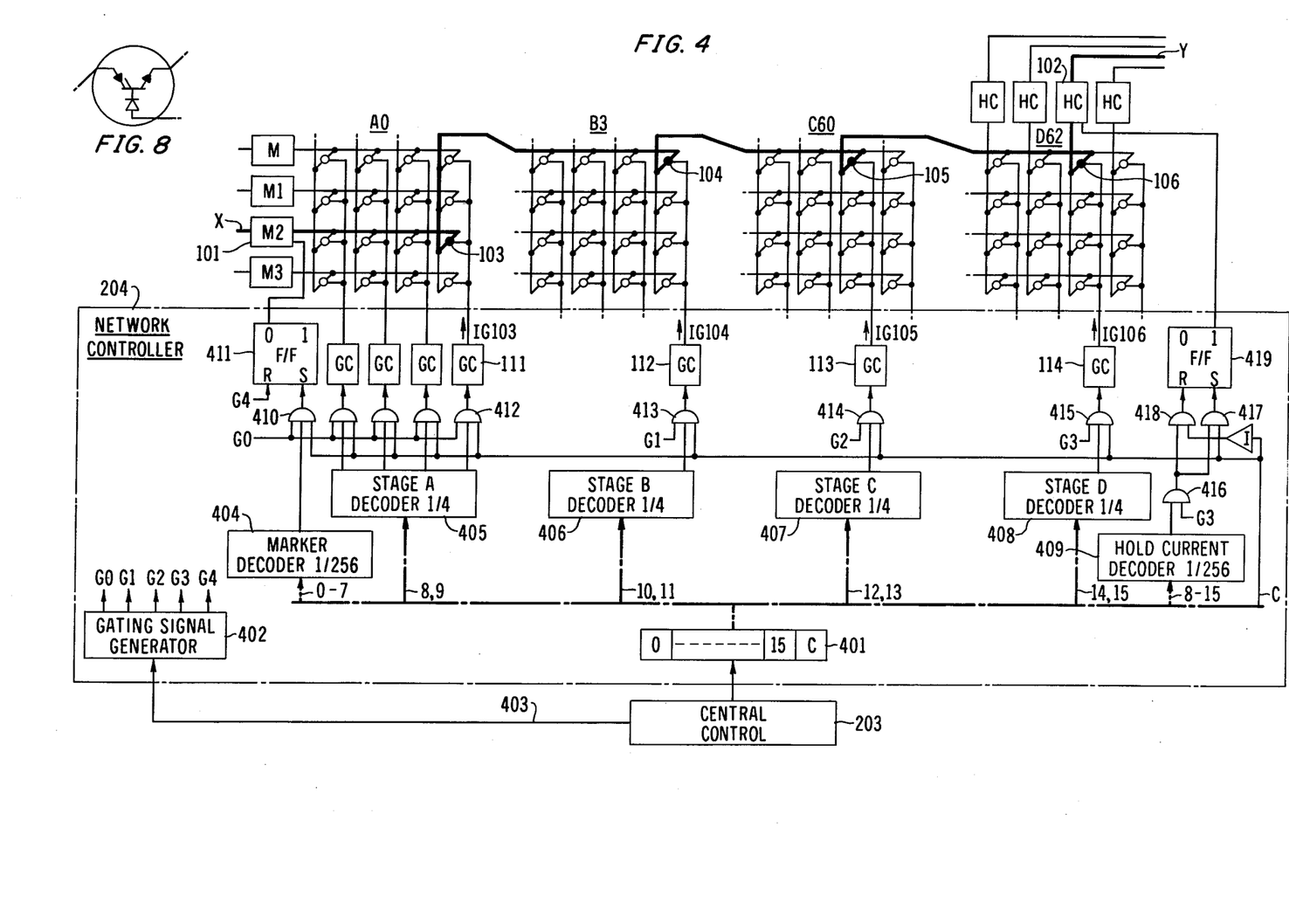
FIG. 4 is a detailed drawing of selected network portions and the control arrangements therefor.
FIG. 8 is a drawing of the cross-point elements utilized in FIG. 4.

Switching network 205, which is shown in more detail in FIG. 3, consists of four stages, denoted A, B, C, and D, wherein each stage comprises sixty-four 4×4 switches. The sixty-four 4×4 switches in each stage are numbered 0 through 63, from top to bottom (FIG. 3). Each 4×4 switch comprises four columns of four thyristor crosspoints each for a total of 16 crosspoints per switch. Four selected 4×4 switches are shown in detail in FIG. 4. Additionally, FIG. 8 shows in detail the thyristor-diode combination employed in each crosspoint of FIG. 4. The network stages are interconnected in a manner well known in the art to provide a 256×256 network. In order to connect an input terminal with an output terminal, a selected 4×4 switch crosspoint in each of the four stages is utilized.

In the course of the following description the various 4×4 switches are referred to by a letter number combination, e.g., B3, in which the letter indicates the switching stage and the number indicates the particular 4×4 switch within that stage. As an example, the bottommost switch in stage C is referred to as C63.

Each of the 256 network input terminals is uniquely associated with a marking voltage source identical to marker voltage source 101 (FIG. 1) and each of the 256 network output terminals is uniquely associated with a hold current source identical to hold current source 102 (FIG. 1). Gate currents are applied to the network to establish communication paths therethrough on the basis of columns of thyristors. When a thyristor in a given stage is to be activated, gate current is applied from a common source to all the thyristors in the same column as the selected thyristor in all of the sixty-four 4×4 switches in the selected stage. Accordingly, each gate current source 301 through 304 comprises four current sources and each current source is associated with a column of 256 (64×4) thyristors. A gate current applied to stage A will flow through only the thyristor connected to a row having a low potential applied by its associated marking voltage source. In the case of thyristors other than those in stage A, the gate current will flow only in the thyristor row which is connected to a preceding thyristor having a gate current flowing therethrough.

Generally stated, a communication path is established by applying a low marking voltage to one out of 256 network input terminals followed by the sequential and overlapped application of gate current to the selected thyristor columns and the application of hold current to the thyristor associated with the selected stage D output. An exemplary switching path between an input X and an output Y, connected in accordance with the broad dark conductor, is shown in FIG. 3. Input X is connected to terminal 2 of stage A0 and output Y is connected to output terminal 2 of switch D62. The 4×4 switches and the crosspoints employed to connect the input terminal X and output terminal Y are shown in greater detail in FIG. 4. Central control 203, as previously discussed, computes the necessary information for the completion of each network path. In the present example, 16 binary digits are generated to define the path and an additional digit, denoted C, is generated to define whether a path is to be established or removed. These 17 digits are transmitted from central control 203 to a storage register 401 (FIG. 4). The present embodiment includes a gating signal generator 402, which, in response to a start signal from central control 203, via conductor 403, generates a series of gating signals G0 through G4 to control the establishment or removal of communication paths.

Figure 5:
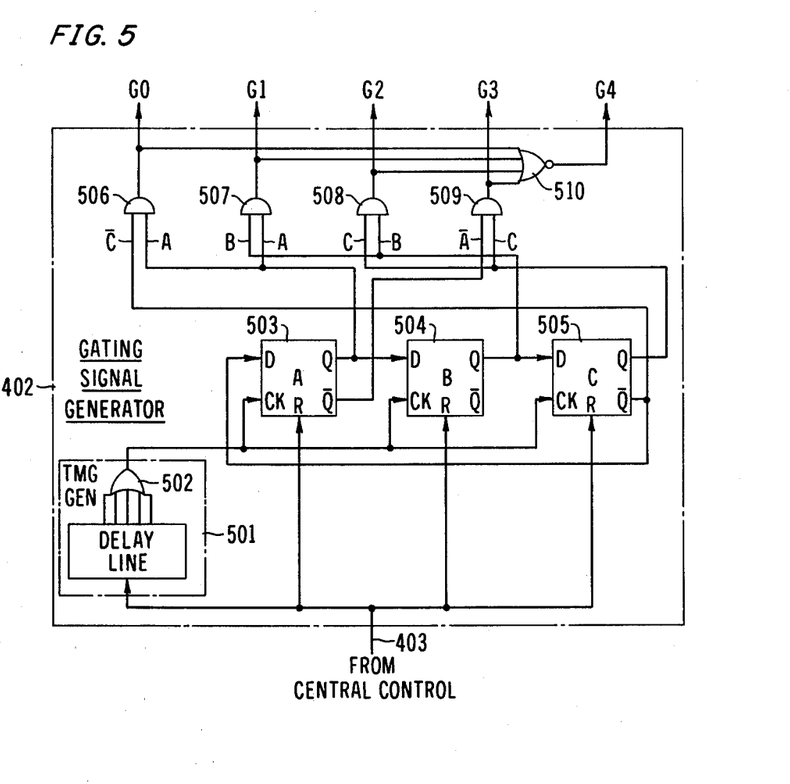
FIG. 5 represents a gating signal generator utilized in FIG. 4.
Figure 5A:
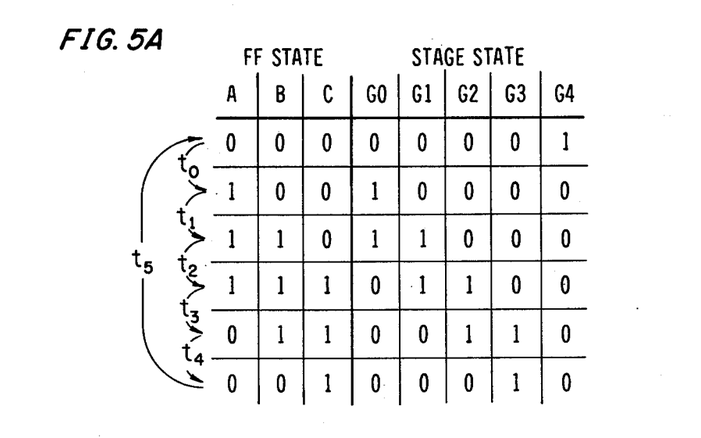
FIG. 5A is a diagram showing the output states of the gating signal generator of FIG. 5.

Gating signal generator 402 is shown in detail in FIG. 5 and a table showing its outputs is given in FIG. 5A. Timing signal generator 501 generates six equally-spaced timing signals, denoted $t_0$ through $t_5$, in response to start signals from central control 203. In the present example, timing signal generator 501 comprises a delay line having five equally-spaced taps. The start signal from central control 203 is a logical "1" pulse, and as this pulse traverses the delay line, six equally-spaced timing pulses are generated which are combined in an OR gate 502 into a series of timing pulses. These timing pulses are applied to the clock input CK of three sequentially connected D flip-flops 503, 504, and 505. It should be noted that the start pulse from central control 203 resets each flip-flop 503 through 505 prior to the generation of any timing signals $t_0$ through $t_5$. The Q outputs of flip-flops 503 through 505 in response to the above-mentioned timing signals, are shown in FIG. 5A. The Q and $\overline{Q}$ outputs of flip-flops 503 through 505 are combined in four AND gates 506 through 509 to generate gating signals G0 through G3, (FIG. 5A). Additionally, the outputs G0 through G3 of all AND gates 506 through 509 are applied as inputs to a NOR gate 510 to produce an additional gating signal G4 (FIG. 5A). The gating signals G0 through G4 (FIG. 7) are generated in sequence and overlapped in time and are utilized in the manner described below to control the sequential and overlapped application of gate currents to the thyristors of the switching network.

FIG. 4 shows the four 4×4 switches utilized in the exemplary connection from input X to output Y and the portion of network controller 204 utilized to establish this path. The 17 digits of each control word placed in storage register 401 by central control 203 are selectively applied to a plurality of decoders. Marker decoder 404 receives bits 0 through 7 of the contents of storage register 401 and applies a logical "1" to the one of its 256 output conductors defined by the eight-bit input. This selected output conductor is uniquely associated with marker voltage source 101 which is in turn associated with input thyristor row including thyristor 103. Bits 8 and 9, 10 and 11, 12 and 13, and 14 and 15 are applied to respective ones of the network stage decoders 405, 406, 407, and 408. Each of the decoders 405 through 408, in response to the digit pairs so applied, applies a logical "1" to the one output conductor out of four defined by the digit pair. Each output conductor of the network stage decoders 405 through 408 is uniquely associated with a single column of 256 thyristors. Bits 8 through 15 of storage register 401 are also applied to a hold current decoder 409, which in response thereto, applies a logical "1" to the one of its 256 output conductors defined by digits 8 through 15. Each output conductor of decoder 409 is uniquely associated with one hold current source.

In accordance with the present example, decoders 404, 405, 406, 407, 408, and 409 are generating logical "1's" on their output conductors associated with a respective one of marker voltage source 101, thyristor 103, thyristor 104, thyristor 105, thyristor 106, and hold current source 102. Additionally, bit C of register 401 is a logical "1", defining that a network path is to be established. At time $t_1$, gating signal G0 becomes a logical "1" (FIGS. 5A and 7) which in combination with the output of marker decoder 404 and the bit C, sets flip-flop 411 via an AND gate 410. It should be noted that the equivalents of AND gate 410 and a flip-flop 411 are associated with each output of decoder 404 and thus with each marker voltage source. Only flip-flop 411 is set, however, since only the AND gate 410 associated with the selected output of decoder 404 can be enabled to set its associated flip-flop. Upon being set, flip-flop 411 applies a logical "0" control signal to maker voltage source 101, which in response thereto, applies a low voltage to the input thyristor row containing thyristor 103.

The signal G0 (FIG. 7) is also combined with bit C of register 401 and the selected output of decoder 405 in an AND gate 412. The logical "1" output of AND gate 412, in response to these inputs, enables gate current source 111 to apply gate current IG-103 to the column of thyristors which includes thyristor 103. Gate current IG-103 flows through the cathode of thyristor 103 to the marker voltage source 101. At time $t_1$, gating signal G1 (FIG. 7) is applied to the AND gates at the output conductors of decoder 406. As described with respect to stage A, only AND gate 413 is enabled since only the selected output of decoder 406 has a logical "1" applied thereto. Enabling AND gate 413 enables gate current source 112 to apply gate current IG-104 to the thyristor column which includes thyristor 104. Gate current IG-104 flows to the marker voltage source 101 via the main communication path of thyristor 103.

At time $t_2$, current source 113 is enabled via AND gate 414 by gating signal G2, bit C and the output of decoder 407, to apply gate current IG-105 to the stage C thyristor column including thyristor 105. This gate current flows to the marker voltage source 101 via the main conduction paths of thyristors 104 and 103. Additionally, at time $t_2$, gating signal G0 (FIG. 7) becomes a logical "0". This terminates current generation by the gate current source 111. The cessation of gate current to thyristor 103 has no effect on the partial communication path, since the gate current being applied to thyristors 104 and 105 keeps thyristor 103 in the "on state". Additionally, the logical "0" signal G0 inhibits the output of AND gate 410. Flip-flop 411, which is associated with AND gate 410, remains in the set state however, until a gating signal is later applied to the reset terminal of that flip-flop.

In the manner described above, gate current source 114 is enabled at time $t_3$ in partial response to the gating signal G3 to apply gate current IG-106 to thryistor 106. Gate current IG-106 flows to the marker voltage source 101 via the main conduction paths of thyristors 105, 104, and 103. Also at time $t_3$ gating signal G1 becomes a logical "0" terminating gate current IG-104. Gating signal G3 is also applied to an AND gate 416, the output of which is an input to two AND gates 417 and 418. The output signals of AND gates 417 and 418 are applied to the set and reset inputs, respectively, of flip-flop 419. The signal outputs of flip-flop 419 control the operation of hold current source 102. Each of the 256 hold current generators is uniquely associated with the equivalents of AND gates 416, 417, and 418 as well as flip-flop 419. As previously stated, AND gate 416 receives a logical "1" from hold current decoder 409. Thus, when gating signal G3 becomes a logical "1" AND gate 416 is enabled to apply a logical "1" to the inputs of AND gates 417 and 418. In response to the logical "1" output of AND gate 416 and the logical "1" C bit AND gate 417 is enabled to set flip-flop 419. Setting flip-flop 419 transmits a logical "1" control signal to hold current source 102 which responds thereto by transmitting hold current to marker voltage source 101 via the main conduction paths of thyristors 106, 105, 104, and 103. Gate currents IG-105 and IG-106 are terminated when gating signals G2 and G3, respectively, (FIG. 7) return to logical "0". The logical "0" gating signal G3 does not terminate the hold current from hold current source 102 since flip-flop 119 remains in the set state until it is reset in accordance with a later described communication path removal sequence.

At time $t_5$ gating signal G4 becomes a logical "1" resetting flip-flop 411, which action causes marker voltage source 101 to change from the low marking voltage to a higher voltage used for the talking and idle line states. Raising the potential at the network input terminal does not reduce the current supplied by hold current source 102 below the hold current level, thus the established path comprising thyristors 103, 104, 105, and 106 remains until hold current source 102 stops transmitting the hold current.

Central control 203 removes a completed path by transmitting to the network controller 204 a control word, in which bits 8 through 15 define the network output terminal of the communication path, a logical "0" control signal C, and the start signal. As previously described, gating signal generator 402 responds to the start code by generating gating signals G0 through G4 (FIGS. 5A and 7). The logical "0" control signal C inhibits the application of marking voltage to any network input terminal and inhibits the application of gate terminals to the network in response to gating signals G0 through G3. Gating signal G3, however, controls the removal of hold current by hold current source 102. Hold current decoder 409 applies a logical "1" to AND gate 416 in response to the digits 8 through 15 of the control word transmitted to register 401. When G3 becomes a logical "1", flip-flop 419 is reset by the output of AND gate 418 as controlled, in part, by the logical "0" control signal C. Hold current source 102 responds to the resetting of flip-flop 419 by terminating its application of hold current to thyristor 106. When this hold current terminates, thyristors 103 through 106 are without hold current and they return to the "off state".

Figure 9:
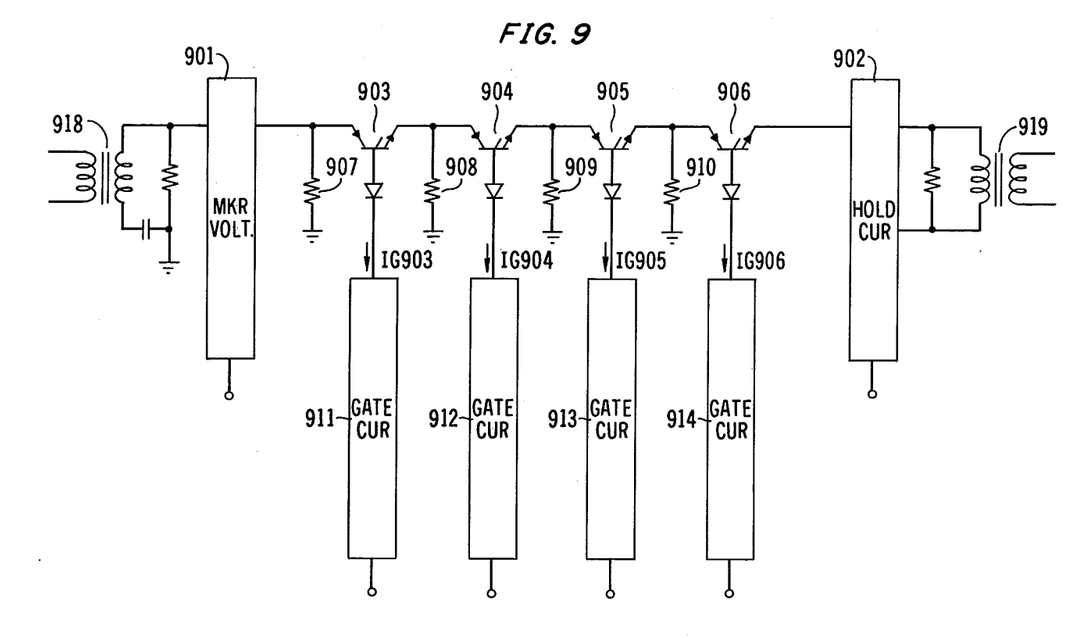
FIG. 9 is a representation of a thyristor communication path embodying the present invention, wherein anode gates are utilized.

The preceding description regards a path establishment arrangement utilizing thyristor cathode gates. The path establishment arrangement of the present invention utilizing the thyristor anode gates is shown in FIG. 9 and described below. In this figure the tens and units of the number designations are the same as the designations of analogous devices in FIG. 1. Initially, marker voltage source 901 increases the voltage applied to the anode of thyristor 903 and a gate current IG-903 is drawn from marker voltage source 901 to gate current source 911. After the establishment of gate current IG-903 gate current IG-904 is established by gate current source 912 which current flows from marker voltage source 901 to the main conduction path of thyristor 903 and the anode of thyristor 904. As previously described gate current sources 913 and 914 are activated in sequence and overlapped in time. After the establishment of gate current IG-906 hold current source 902 is activated resulting in hold current flowing from marker voltage source 901 to hold current source 902 to the main conduction paths of thyristors 903 through 906.

What is claimed is:

1. In combination:
 a plurality of thyristors comprising a first and a last thyristor wherein each of said thyristors comprise a main conduction path between a first and a second electrode and a control path between said first electrode and a gate electrode;
 connecting means for serially connecting the main conduction paths of said thyristors by connecting the second electrode of each thyristor, except the last thyristor, to the first electrode of a subsequent thyristor;
 marking means for applying a marking potential to the first electrode of said first thyristor;
 control current generator means connected to said gate electrodes for producing control currents, equal to or greater than the holding current of said thyristors, in the control paths of each of said thryistors in sequence and overlapped in time, from said first to said last thyristor; and
 holding means connected to said last thyristor for producing a current, equal to or greater than the holding current of said thyristors, in the main conduction paths of said thyristors.

2. The combination in accordance with claim 1 wherein said holding means comprising means for producing said hold current in the main conduction paths of said thyristors at substantially the same time that one of said control currents is applied to said last thyristor; and
 wherein said control current generator means includes means for inhibiting all control currents a predetermined period of time after said holding means applies said hold current.

3. The combination in accordance with claim 1 wherein said holding means comprises means for producing said hold current in the main conduction paths of said thyristors at substantially the same time that one of said control currents is produced in said last thyristor; and wherein said control current generator includes means for inhibiting the control current produced in a given thyristor, except said last thyristor, a predetermined period of time after the application of a control current to a subsequent thyristor and for inhibiting the control current in said last thyristor a predetermined period of time after said holding means produces said holding current in said main conduction path.

4. The method of establishing a communication path from the first to the last of a plurality of serially connected thyristors comprising a first and second main conduction electrode and a gate electrode, wherein the second main conduction electrode of each thyristor, except the last thyristor, is connected to the first main conduction electrode of a subsequent thyristor, comprising the steps of:
   A. applying a marking voltage to the first main conduction electrode of said first thyristor;
   B. producing gate currents equal to or greater than the holding current of said
   thyristors in each thyristor, in sequence and overlapped in time, from the first to the last of said thyristors; and
   C. producing a hold current in the second main conduction electrode of said last thyristor.

5. The method of establishing a communication path from the first to the last of a plurality of serially connected thyristors each comprising a first and a second main conduction electrode and a gate electrode, wherein the second main conduction electrode of each thyristor, except the last thyristor, is connected to the first main conduction electrode of a subsequent thyristor, comprising the steps of:
   A. applying a marking voltage to the first main conduction electrode of said first thyristor;
   B. producing gate currents, equal to or greater than the holding current of said thyristors, in each thyristor in sequence and overlapped in time from the first to the last of said thyristors;
   C. inhibiting the gate current produced in a given thyristor, except said last thyristor, a predetermined period of time after the production of a gate current in a subsequent thyristor;
   D. producing a hold current in the second main conduction electrode of said last thyristor; and
   E. inhibiting the gate current produced in said last thyristor a predetermined period of time after the production of a hold current in its second main conduction electrode.

6. In combination:
   a plurality of thyristors comprising a first and a last thyristor wherein the anode of each thyristor, except said last thyristor, is connected to the cathode of a subsequent thyristor;
   marking means for applying a low potential to the cathode of said first thyristor;
   a gate current generator for applying gate currents, equal to or greater than the holding current of said thyristors, to the gates of each of said thyristors in sequence and overlapped in time, from said first to said last thyristor; and
   holding means for applying a current, equal to or greater than the holding current of said thyristors, to the anode of said last thyristor.

7. The combination in accordance with claim 6 wherein said holding means comprises means for applying said hold current to the anode of said last thyristor at substantially the same time that one of said gate currents is applied to said last thyristor; and
   wherein said gate current generator includes means for inhibiting all gate currents a predetermined period of time after said holding means applies said hold current.

8. The combination in accordance with claim 6 wherein said holding means comprises means for applying said hold current to the anode of said last thyristor at substantially the same time that one of said gate currents is applied to said last thyristor; and
   wherein said gate current generator includes means for inhibiting the gate current applied to a given thyristor, except said last thyristor, a predetermined period of time after the application of a gate current to a subsequent thyristor and for inhibiting the gate current applied to said last thyristor a predetermined period of time after said holding means applies a holding current to its anode.

9. The method of establishing a communication path through a plurality of serially connected thyristors comprising a first and last thyristor, and wherein the anode of each thyristor, except the last thyristor, is connected to the cathode of a subsequent thyristor, comprising the steps of:
   A. applying a low voltage to the cathode of said first thyristor;
   B. applying gate currents equal to or greater than the holding current of said thyristors to each thyristor in sequence and overlapped in time from the first to the last of said thyristors; and
   C. applying a hold current to the anode of said last thyristor.

10. The method of establishing a communication path through a plurality of serially connected thyristors comprising a first and a last thyristor, and wherein the anode of each thyristor, except the last thyristor, is connected to the cathode of a subsequent thyristor, comprising the steps of:
   A. applying a low voltage to the cathode of said first thyristor;
   B. appylying gate currents equal to or greater than the holding current of said thyristors to each thyristor in sequence and overlapped in time from the first to the last of said thyristors;
   C. inhibiting the gate current applied to a given thyristor, except said last thyristor, a predetermined period of time after the application of a gate current to a subsequent thyristor;
   D. applying a hold current to the anode of said last thyristor; and
   E. inhibiting the gate current applied to said last thyristor a predetermined period of time after the application of a hold current to its anode.

11. In combination:
   a plurality of thyristors comprising a first and a last thyristor wherein the anode of each thyristor, except said last thyristor, is connected to the cathode of a subsequent thyristor;
   timing means for generating a plurality of timing signals defining time intervals;
   marking means responsive to a first one of said timing signals for applying a low potential to the cathode of said first thyristor;
   a gate current generator responsive to said timing signals for appylying gate currents, equal to or greater than the holding current of said thyristors, to the gates of said thyristors in sequence from said first to said last thyristor;

means responsive to said timing signals for inhibiting said gate current applied to the gate of any given thyristor, except said last thyristor, a predetermined period of time after a current equal to or greater than said holding current is applied to the gate of a subsequent thyristor;

holding means, responsive to said timing signals, for applying a current equal to or greater than said holding current to the anode of said last thyristor; and means responsive to said timing signals, for inhibiting the gate current applied to said last thyristor a predetermined period of time after the application of a hold current to its anode.

12. In combination:

a plurality of switching stages including a first stage and a last stage, said switching stages comprising $n$ input terminals, $m$ output terminals and $n \times m$ thyristors each having its cathode connected to one of said input terminals and its anode connected to one of said output terminals;

interconnecting means for sequentially interconnecting said switching stages such that the output terminals of each switching stage, except said last switching stage, are connected to the input terminals of a subsequent switching stage;

$n$ marking voltage sources each uniquely associated with one of said input terminals of said first switching stage for selectively applying a low voltage to its associated input terminal;

means for applying gate currents to selected thyristors in each of said switching stages in sequence and overlapped in time;

means for inhibiting a gate current applied to the gate of any given thyristor after a current, equal to or greater than said holding current, flows from the anode to the cathode of said given thyristor; and $m$ holding current sources each being uniquely associated with one of said ouput terminals of said last switching stage for selectively applying a hold current to its associated output terminal.

13. In combination:

a plurality of thyristors comprising a first and a last thyristor wherein the cathode of each thyristor, except said last thyristor, is connected to the anode of a subsequent thyristor;

marking means for applying an increased potential to the anode of said first thyristor;

a gate current generator for drawing a gate current, equal to or greater than the holding current of said thyristors, from the gate of each of said thyrsitors in sequence and overlapped in time, from said first to said last thyristor; and holding means for drawing a current, equal to or greater than the holding current of said thyristors, from the cathode of said last thyristor.

14. The combination in accordance with claim 13 wherein said holding means comprises means for drawing said hold current from the cathode of said last thyristor at substantially the same time that one of said gate currents is drawn from said last thyristor; and wherein said gate current generator includes means for inhibiting all gate currents a predetermined period of time after said holding means produces said hold current.

15. The combination in accordance with claim 13 wherein said holding means comprises means for drawing said hold current from the cathode of said last thyristor at substantially the same time that one of said gate currents is drawn said last thyristor; and wherein siad gate current generator includes means for inhibiting the gate current drawn from a given thyristor, except said last thyristor, a predetermined period of time after the gate current is produced in a subsequent thyristor and for inhibitng the gate current drawn from said last thyristor a predetermined period of time after said holding means draws the holding current from the cathode of said last thyristor.

* * * * *

UNITED STATES PATENT AND TRADEMARK OFFICE
CERTIFICATE OF CORRECTION

PATENT NO. : 4,061,884
DATED : December 6, 1977
INVENTOR(S) : James Mark Adrian

It is certified that error appears in the above-identified patent and that said Letters Patent are hereby corrected as shown below:

Column 8, line 54, "comprising" should read --comprises--. Column 10, line 22, before "last", insert --a--. Column 12, line 32, "siad" should read --said--.

Signed and Sealed this

Twenty-sixth Day of June 1979

[SEAL]

Attest:

RUTH C. MASON
Attesting Officer

DONALD W. BANNER
Commissioner of Patents and Trademarks